219-121
4/12/77    XR    4,017,706    SR

United States Patent [19]
Aubrecht et al.

[11] 4,017,706
[45] Apr. 12, 1977

[54] METHOD OF PROVIDING A TORQUE MOTOR WITH AIR GAPS OF EQUAL LENGTH

[75] Inventors: Richard A. Aubrecht, East Aurora; Richard N. Hart, Crittenden, both of N.Y.

[73] Assignee: Moog Inc., East Aurora, N.Y.

[22] Filed: Jan. 12, 1976

[21] Appl. No.: 648,284

[52] U.S. Cl. .................... 219/69 M; 219/69 E; 219/121 EM; 219/121 LM
[51] Int. Cl.² ........................................ B23P 1/08
[58] Field of Search ............ 219/69 M, 69 E, 69 R, 219/69 G, 69 V, 68, 121 EB, 121 EM, 121 L, 121 LM

[56] References Cited
UNITED STATES PATENTS

| | | | |
|---|---|---|---|
| 2,902,586 | 9/1959 | Matulaitis | 219/69 V |
| 3,023,782 | 3/1962 | Chares et al. | 137/623 |
| 3,410,980 | 11/1968 | Gugger et al. | 219/69 M |
| 3,431,389 | 3/1969 | Tudor et al. | 219/121 EM |
| 3,504,153 | 3/1970 | Beyersdorf | 219/69 M |

*Primary Examiner*—Bruce A. Reynolds
*Attorney, Agent, or Firm*—Sommer & Sommer

[57] ABSTRACT

A method of providing a torque motor with air gaps of equal length between an armature interposed between two spaced polepieces, comprises the steps of: assembling the torque motor so that the armature is roughly positioned between the polepieces, positioning an electrode so that two spaced portions thereof of equal width are arranged proximate the air gaps, providing a plurality of repetitious pulses of electrical energy between the electrode and the torque motor assembly, moving the electrode and torque motor assembly relative to one another, and removing proximate material from the armature and polepieces, as necessary, by electrical discharge between the electrode and torque motor assembly, thereby to provide air gaps of equal length between the armature and the polepieces.

5 Claims, 5 Drawing Figures

METHOD OF PROVIDING A TORQUE MOTOR WITH AIR GAPS OF EQUAL LENGTH

BACKGROUND OF THE INVENTION

1. Field of the Invention

The present invention relates generally to the art of servovalves and servomechanisms, and more particularly to a novel method for providing air gaps of equal length in a torque motor assembly intended for use in a servovalve or servo-mechanism.

2. Description of the Prior Art

Servovalves and servomechanisms employing torque motors of the type herein illustrated and described are representatively shown in U.S. Pat. Nos. 3,023,782, 3,228,423 and 3,257,911, the aggregate disclosures of which are hereby incorporated by reference.

In such torque motors, the armature is conventionally supported by a flexure spring or flexure tube member such that, with the permanent magnets discharged, ideally, the armature plate portion is precisely centered between the two spaced pole-pieces. The torque motor is made operable by charging the permanent magnets, which results in one polepiece having a magnetic North, and the other, a magnetic South. Magnetic flux then flows from the North polepiece, through one air gap to the armature plate portion, through the armature plate portion, and then from the armature plate portion across the second air gap to the South polepiece. One or more such pairs of such active air gaps may be utilized with the armature of any specific torque motor design.

The armature is normally attracted to each polepiece by a force related to the magnitude of the flux which, in turn, is related to the length of the air gap in the flux-carrying direction. If the individual air gaps of each pair of air gaps are precisely equal in length, then no net force will be developed on the armature. If, however, one air gap is shorter than the other opposite air gap, then the armature will be attracted to the polepiece of the shorter gap.

The torque motor coils are located about the armature, and are energized with a d.c. electrical current to provide a command into the servovalve. This d.c. current will magnetically polarize the armature, one end being North and the other end being South depending upon the direction of the d.c. current. Additional flux induced by the coil current will flow through diagonally opposite air gaps of the torque motor and thereby create a corresponding torque on the armature.

It should be recognized that, in practice, many different types and configurations of torque motors may be used as the electrical input transducer of a servovalve. The symmetrical, double-ended armature type of torque motor having two pairs of air gaps, as illustrated herein, is merely representative of one species of such torque motors. The schematic for this type of torque motor is given is FIG. 11.26 on page 337 of the book "Fluid Power Control", Blackburn, Reethof and Shearer, published jointly by The Technology Press of MIT and John Wiley and Sons, Inc. (1960), the disclosure of which is hereby incorporated by reference. Numerous other schematics included in Section 11.2 of Chapter 11 of this book illustrate other torque motor configurations for developing both rotational and translational motion, all of which would benefit from the air gap fabrication technique herein disclosed.

If the air gaps are of unequal length in a typical electrohydraulic servovalve application, the servovalve may have a null offset such that other than a zero electrical input current must be impressed upon the servovalve coils to achieve zero hydraulic output.

Other delitescent results can occur from the presence of air gaps of unequal length in the torque motor of a servovalve, such as excessive temperature null shift and latching of the armature to a polepiece, such phenomena being well known and understood by those skilled in the art.

The individual air gap lengths (i.e., the distance between the armature and each polepiece) will typically range from 0.010 to 0.050 inch for torque motors of various physical sizes. Generally, the servovalve manufacturer attempts to maintain the desired air gap length within ±0.0005 inch. This close tolerance cannot practically be obtained by accurate fabrication of the torque motor, as the dimensional tolerances of many individual parts contribute to determining the final air gap lengths.

Heretofore, the typical manufacturing procedure has been to assemble the servovalve torque motor (including the armature, flexure support, coils, permanent magnets, and polepieces) to the base mounting structure on a trial basis. The resulting air gaps are then measured by mechanical or optical means. The desired thicknesses of correcting shims could then be calculated. The torque motor is then disassembled and reassembled to incorporate the correcting shims of the calculated thickness. The air gaps are then remeasured and the torque motor assembly is either accepted or rejected for yet another trial with shims of different thicknesses.

An allowable degree of mismatch of air gap lengths is established for each servovalve design reflecting the desired level of quality and performance. Clearly, a manufacturing process which insures precisely matched air gaps without the tedious trail and error selection of shims, or other means, would yield high-quality servovalves in an expeditious manner.

SUMMARY OF THE INVENTION

The present invention overcomes the foregoing disadvantages of such known prior art technique by providing a novel method of expeditiously and accurately providing a torque motor with air gaps of equal length between an armature positioned between two spaced polepieces.

The inventive method includes the steps of: initially assembling the entire torque motor so that the armature is roughly positioned between the polepieces, the space between this armature and each of a pair of polepieces defining one of a cooperative pair of air gaps; positioning an electrode so that two spaced portions thereof of equal width are arranged proximate the air gaps; providing a plurality of repetitious pulses of sufficient electrical energy between the electrode and the torque motor; moving the electrode and torque motor relative to one another; and removing or eroding proximate material from the armature and polepieces, as necessary, by electrical discharge between the electrode portions and the torque motor, thereby to provide air gaps of equal flux-carrying length between the armature and the polepieces.

In practicing this method, the electrode and torque motor may be moved relative to one another such that the electrode portions are moved progressively further into the air gaps. The torque motor may be moved slidably relative to the electrode, and the electrode may be rotated during such machining operation to distribute the effect of electrode wear. The electrode portions may be caused to first move progressively deeper into the air gaps, after which the electrode portions may be progressively withdrawn therefrom.

Accordingly, one general object of the present invention is to provide a novel method for providing a torque motor with air gaps of equal length between an armature interposed between two spaced polepieces.

Another object is to provide a novel method for selectively machining the polepieces and armature of a torque motor to provide pairs of cooperative air gaps of equal length.

Another object is to provide a novel fabrication method for obtaining symmetrical torque motor air gaps in a consistent and repeatable manner without the need for correcting shims, adjustments, or other trial and error assembly techniques.

Another object is to provide a novel method for obtaining a torque motor having precisely matched air gap lengths, said torque motor comprising a plurality of individual component parts generally having broader dimensional tolerances.

Still another object is to provide a novel method for selectively machining a torque motor which minimizes the possibility of human error.

These and other objects and advantages will become apparent from the foregoing and ongoing specification, the drawings, and the appended claims.

BRIEF DESCRIPTION OF THE DRAWING FIGURES

DESCRIPTION OF THE PREFERRED EMBODIMENTS

Figure 1:
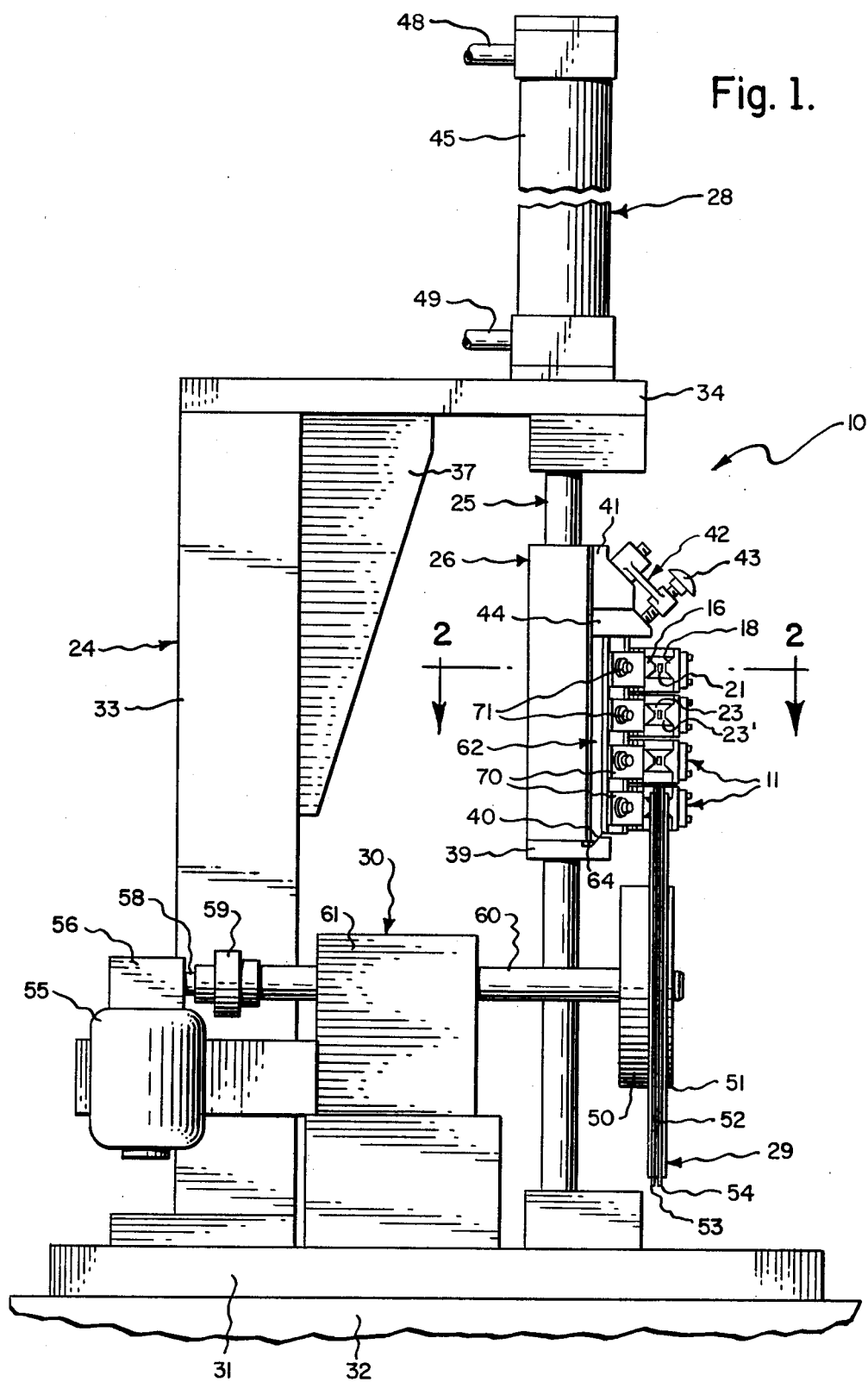
FIG. 1 is a fragmentary right side elevation of one form of apparatus for practicing the inventive method, this view showing the frame, the vertically-movable slide, the electrodes, the torque motor assemblies, the fixture for holding such assemblies, and the means for rotating the electrodes.

At the outset, it should be clearly understood that like reference numerals are intended to identify the same elements and/or structure consistently throughout the several drawing figures, as such elements and/or structure may be further described or explained by the entire written specification of which this detailed description is an integral part.

Figure 2:
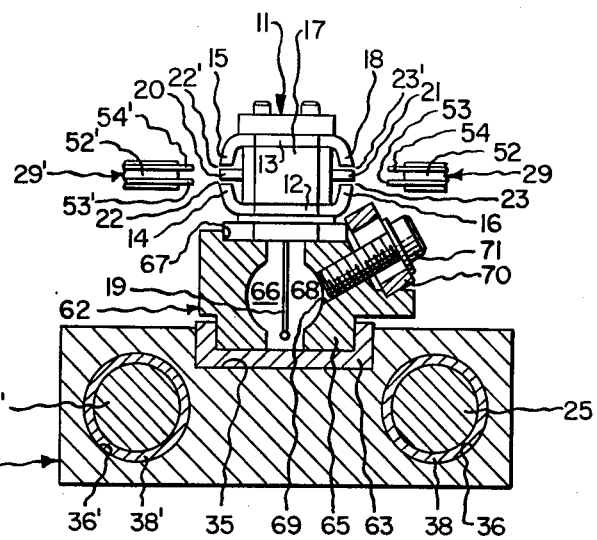
FIG. 2 is an enlarged fragmentary horizontal sectional view thereof, taken generally on line 2—2 of FIG. 1, and rotated 90° in a counterclockwise direction with respect to the orientation of FIG. 1, this view showing the slide, the fixture, and a torque motor assembly, this view further illustrating two cooperative pairs of air gaps between the armature plate portions and the spaced polepieces.
Figure 3:
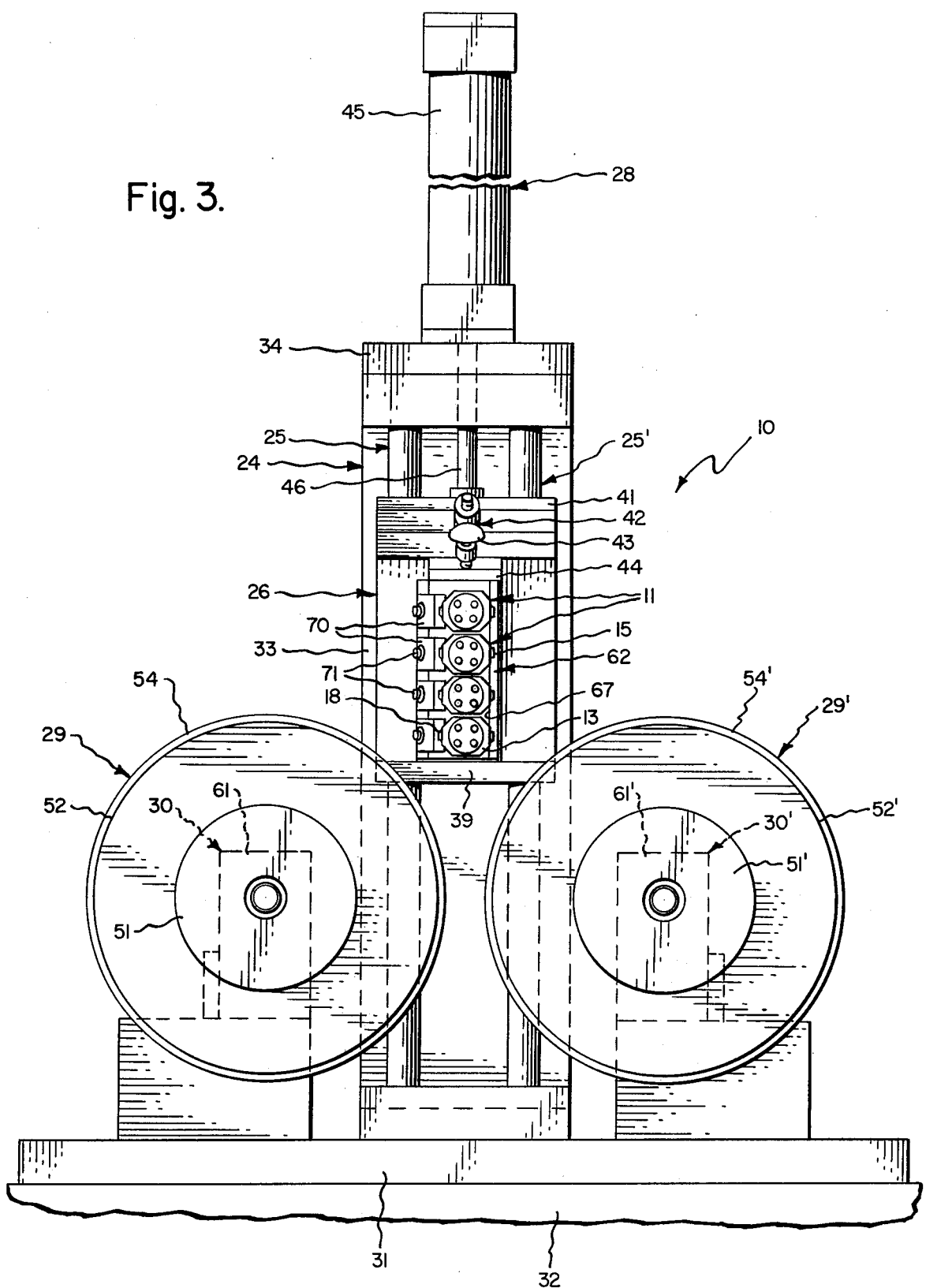
FIG. 3 is a fragmentary front elevation of the apparatus depicted in FIG. 1, this view particularly illustrating the position of the torque motor assemblies with respect to the two electrodes.

Referring initially to FIGS. 1-3, the present invention broadly provides apparatus, of which the presently preferred embodiment is generally indicated at 10, for, and a novel method of, providing air gaps of equal length between an armature positioned between two spaced polepieces of a torque motor assembly, commonly used in electrohydraulic servovalves and servomechanisms.

Specific details of the structure and operation of such torque motors and servovalves are more fully shown and described in U.S. Pat. Nos. 3,023,782, 3,228,423 and 3,257,911, the aggregate disclosures of which are hereby incorporated by reference.

Returning now to the several drawing figures, and more particularly to FIG. 2 thereof, a torque motor assembly, of the general type illustrated and described in the aforesaid U.S. Pat. No. 3,023,782, is generally indicated at 11. This torque motor assembly 11 is depicted there as including, inter alia, a pair of upper and lower pole plates 12 and 13, respectively, having their left end portions bent toward each other to provide a cooperative pair of spaced and facing left polepieces 14, 15, and having their right end portions similarly bent toward each other to form another cooperative pair of spaced and facing right polepieces 16, 18. A permanent magnet 17 is shown as disposed between pole plates 12, 13. This torque motor assembly 11 further includes an armature member (not fully shown), a flapper member (not shown), a flexure tube member (not shown), a second permanent magnet (not shown), electrical coils, and a mechanical feedback spring wire 19, as explicitly shown and described in the aforesaid U.S. Pat. No. 3,023,782. The mechanical feedback spring wire 19 is depicted as extending generally perpendicularly to pole plates 12 and 13 (downwardly in the view of FIG. 2). The left end of this armature member is shown as including a horizontally-disposed left plate portion 20 operatively interposed in the space between the left polepieces 14, 15, and a horizontally-disposed right plate portion 21 operatively interposed in the space between the right polepieces 16, 18.

By so positioning the armature left plate portion between the left polepieces, a lower air gap 22 is defined between the upwardly-facing horizontal flat surface of left polepiece 14 and the downwardly-facing horizontal flat surface of the left plate portion 20, and a cooperative upper air gap 22' is defined between the upwardly-facing horizontal flat surface of left plate portion 20 and the downwardly-facing horizontal flat surface of left top polepiece 15. Similarly, by positioning the armature right plate portion 21 between the right polepieces, a lower air gap 23 is defined between the upwardly-facing horizontal flat surface of bottom polepiece 16 and the downwardly-facing horizontal flat surface of right plate portion 21, and a cooperative upper air gap 23' is defined between the upwardly-facing horizontal flat surface of right plate portion 21 and the downwardly-facing horizontal flat surface of top polepiece 18. The "length" of these air gaps 22, 22', 23 and 23' is defined to be the perpendicular distance between these opposing flat and parallel surfaces, this distance being vertical in FIG. 2; and the "depth" of these air gaps is the distance between said surfaces measured parallel thereto and parallel to the armature, this distance being horizontal in the left-right direction in FIG. 2.

In the well known manner, an electrical command input current (not shown) may be supplied to the coils of torque motor assembly 11 to produce a predictable electrically-induced magnetic field which will result in an unbalance of flux in the cooperative air gaps, thus producing a net force on respective plate portions of the armature. The combined effect of such forces is to create a net torque on the armature, it being appreciated that the entire armature will act substantially as though it were pivoted proximate its midpoint. Thus, from an initial centered or null position, at which the length of left air gaps 22, 22' are equal, and the length of right air gaps 23, 23' are equal, a particular input command current may cause the armature to pivot in either a clockwise or counterclockwise direction as viewed in FIG. 2. During such clockwise pivotal movement of the armature, the left plate portion 20 will move closer to upper polepiece 15 (thereby increasing the length of air gap 22 and decreasing the length of air gap 22'), and the right plate portion 21 will move closer to lower polepiece 16 (thereby decreasing the length of air gap 23 and increasing the length of air gap 23'). Conversely, during counterclockwise pivotal movement of the armature, again as viewed in FIG. 2, the left plate portion 20 will move closer to lower polepiece 14 (thereby decreasing the length of air gap 22 and increasing the length of air gap 22'), and the right plate portion will move closer to the upper polepiece 18 (thereby increasing the length of air gap 23 and decreasing the length of air gap 23').

However, in initially assembling this torque motor assembly 11, it is normally desired to center the armature plate portions 20, 21 between the cooperative pairs of pole-pieces 14, 15 and 16, 18, respectively. Otherwise stated, it is ideally desired to assembly the torque motor such that its left air gaps 22, 22' are of equal length, and its right air gaps 23, 23' are of equal length, so that the rigid armature will be in a normally centered or null position with respect to the polepieces before the permanent magnets are charged and the electrically-induced magnetic field is created. By thus centering the armature plate portions between the cooperative pairs of polepieces, the balanced cooperative air gaps insure that only an electrically-commanded difference in magnetic flux between the air gaps will produce a corresponding movement of the armature. This is extremely difficult, if not impossible, to achieve and hence there is great need for the practice of the present invention.

Accordingly, the present invention provides a novel and unique method for electrical discharge machining or eroding of the armature plate portions and/or the polepieces, as necessary, to insure that the left air gaps 22, 22' will be of equal length, and the right air gaps 23, 23' will be of equal length, thereby establishing that the armature plate portions will be in the desired centered position. Desirably, all four air gaps are machined to be of equal length and of a length that is optimum for the desired performance parameters of the torque motor.

Referring now principally to FIGS. 1 and 3, the apparatus 10 for performing the inventive method is shown as broadly including a frame 24; a pair of horizontally-spaced right and left vertical slide rod 25, 25', respectively, mounted on the frame (FIG. 3); a slide 26 slidably mounted on slide rods 25, 25' for upward and downward movement therealong; a hydraulic actuator 28 mounted on the frame and operative to selectively move the slide; an electrical circuit (not fully shown) including a pair of horizontally-spaced right and left electrodes 29, 29' severally spaced from but proximate the torque motor assembly 11; and means, generally indicated at 30, 30', for selectively rotating the right and left electrodes.

The frame 24 is shown as being a generally C-shaped member, as viewed from the side (FIG. 1), having a lowermost horizontal plate-like base member 31 adapted to rest on a suitable support 32, a vertical leg 33 upstanding from a rear portion (leftward in FIG. 1) of the base member, and an upper forwardly-extending horizontal plate-like member 34 secured to leg 33 and additionally supported by a gusset plate 37 suitably secured to leg 33 and upper member 34.

The slide rods 25, 25' are shown as being horizontally-spaced vertically-elongated cylindrical rods having their upper end portions suitably secured to frame upper member 34, and having their lower end portions suitably secured to the frame base member 31.

The slide 26 is depicted as being a vertically-elongated solid member having a substantially rectangular transverse cross-section (FIG. 2), but provided with a vertically-elongated rectangular recess 35. Referring to FIG. 2, this slide 26 is shown further provided with a pair of horizontally-spaced right and left through holes 36, 36', each of which has a bushing 38, 38', respectively, operatively positioned therein to receive slide rods 25, 25', respectively. In this manner, the slide 26 is slidably mounted on slide rods 25, 25' for upward and downward movement therealong. A lower stop plate 39 is shown suitably secured to the bottom of slide 26 and has an upwardly-facing horizontal socket or groove 40 communicating with slide recess 35 for a purpose hereinafter explained. On an upper portion of its forward face, the slide 26 is shown provided with a clamp bracket 41 upon which an inclined clamp assembly 42 is mounted. This clamp assembly includes a clamp screw 43 shown arranged to engage a clamp block 44 for a purpose hereinafter explained.

The hydraulic actuator 28 is depicted as having the lower end of its vertically-disposed stationary cylinder 45 suitably secured to the frame upper member 34 between slide rods 25, 25', and its vertically-movable actuator rod 46 penetrating this plate member 34 and engaging the slide 26 to effect upward and downward movement thereof. Thus, hydraulic pressure may be selectively supplied through actuator upper conduit 48 to move the actuator rod 46 and slide 26 downwardly or may be selectively supplied through actuator lower conduit 49 to move the actuator rod 46 and slide 26 upwardly.

Each of the electrodes 29, 29' is shown as being a vertically-disposed circular disc-like member which is adapted to be rotated about a horizontal axis. In FIG. 1, a central portion of the right electrode 29 is shown clamped between a rear flange member 50, and a front flange member 51, it being appreciated that the left electrode 29' is similarly clamped between corresponding flanges 50' and 51' (FIG. 3). As best shown in FIG. 2, each of electrodes 29, 29' is depicted as having an outer cylindrical peripheral surface 52, 52', respectively, from which two axially-spaced raised radially outwardly extending annular flanges or ribs, each rectangular in cross-section, 53, 54 and 53', 54', respectively, extend. These electrode portions are continuous or uninterrupted circumferentially about the periphery of each electrode and, when viewed from a tangential direction (FIGS. 2, 4 and 5), severally appear to present a stepped substantially rectangular outline or shape bounded by an annular vertical flat upper end face, an intermediate raised peripheral cylindrical surface, and an annular vertical flat lower end face.

Adverting now to FIG. 1, the means 30 for rotating the right electrode 29 is shown as being suitably mounted on the frame, and including an electric motor 55 having an upper output shaft (not shown) adapted to be rotated about a vertical axis; a gear box 56 operatively associated with the motor output shaft and adapted to transfer such vertical axis of rotation to a horizontal axis of rotation, and further adapted to cause its output shaft 58 to rotate at an angular speed proportional to that of the motor output shaft; and a coupling 59 operatively associated with the gear box output shaft 58 and adapted to join the left end of a driven shaft 60, suitably journalled in a bearing block assembly 61 mounted on the frame. As heretofore noted, the right electrode 29 is held between flanges 50, 51, each of which is suitably secured to the right marginal end portion of shaft 60. In this manner, the motor 55 may be suitably operated to rotate electrode 29 about the horizontal axis of shaft 60. Of course, the means 30' for rotating the left electrode 29' contains like elements similarly arranged and need not be explicitly described again. Alternatively, a single means may be operatively connected to rotate both electrodes, as desired. In addition, this means may further comprise means for moving one or both of the electrodes toward and away from each other.

Adverting now principally to FIG. 2, the apparatus 10 may further include a holder assembly, generally indicated at 62, which is adapted to hold a plurality of torque motor assemblies 11, four of these being shown in FIGS. 1 and 3. As best shown in FIG. 2, the holder assembly 62 includes a vertically-elongated member 63 adapted to be received in slide recess 35 and has a oppositely-facing vertical recess to receive a fixture member 65 suitably secured to member 63. Holder 62 is retained in the position on slide 26 by engagement of its lowermost tongue portion 64 in groove 40, and at its upper end by the clamping action of clamp screw 43 on clamp block 44. Now again referring to FIG. 2, fixture 65 is shown as having a series of recesses 66 extending between its flat face 68 and its parallel face, which is covered by member 63. Face 68 is undercut to provide a vertical shoulder 67. There are four such recesses 66 vertically spaced and severally adapted to protectively receive the feedback spring wires 19 of torque motor assemblies 11. The bases of the torque motor assemblies abuttingly engage fixture face 68 and shoulder 67. To hold the torque motor assemblies on the fixture 65, the latter is shown further provided with four tapped horizontal recesses 69. As best shown in FIG. 2, a clamp plate 70 having a slot receiving the threaded shank portion of a headed fastener 71, may be caused to act on the right corner portion of the torque motor base by suitably tightening fastener 71. In this manner, each torque motor assembly 11 may be releasably held to the fixture 65.

The preferred embodiment of the apparatus further includes a known electrical circuit (not shown) operative to erode material from the armature plate portions and polepieces by an electrical discharge machining (EDM) technique.

Specific examples of the structure and operation for accomplishing this EDM process are representatively shown in U.S. Pat. Nos. 3,538,289, 3,562,476, 3,614,371 and 3,729,609, the aggregate disclosures of which are hereby incorporated by reference.

Broadly, the EDM technique includes an electrical circuit having a suitable pulse generator adapted to supply repetitious pulses of electrical energy between a cathode and a spaced anode. In the electrical discharges between these two electrodes, the supplied electrical energy is transformed into thermal energy which may be usefully employed to erode or machine those portions of the electrodes which are positioned closest to one another. Normally, a workpiece, such as torque motor assembly 11, is operatively arranged to constitute either the cathode or the anode of this circuit. Thereafter, the other of the cathode and anode, such as electrode 29 or 29', is positioned proximate to but spaced from the workpiece, such that electrical discharge between the electrode and workpiece will erode or machine a desired proximate portion of the workpiece. Normally, such electrical discharge occurs in a dielectric bath. Specific examples of pulse generators suitable for use in such EDM systems, typically include: an RC relaxation generator, an RCL relaxation generator, an RCLL relaxation generator, an RCR relaxation generator, and RV relaxation generator, an RCV relaxation generator, or an interrupted or rotary pulse generator.

One highly advantageous feature afforded by the EDM technique is that since there is no physical contact between the workpiece (i.e., either the cathode or the anode) and the "tool" (i.e., the other of the cathode and anode), no forces are exerted by the "tool" on the workpiece during such discharge erosion. Hence, the EDM technique is particularly suited to machine relatively delicate workpieces where such forces exerted by a tool on the workpiece would normally pose a significant problem. Of course, the rate by which metal is removed from the workpiece is largely a function of the area to be machined, the shape of the workpiece, and the electrical conditions, these including the amplitude, duration, frequency and recurrent frequency of the electrical pulses supplied by the pulse generator. As with the more conventional machining techniques, the quality of surface finish and "tool" wear are inversely related to the amount and speed of metal removal. Other parameters and details of the EDM technique may be found in Livshits, *Electro-Erosion Machining of Metals*, Butterworth & Co. (Publishers) Ltd., London (1960); and Doyle, *Manufacturing Processes and Materials for Engineers*, pp. 705–706, Prentice-Hall, Inc., Englewood Cliffs, New Jersey, 4th Ed. (1964), the aggregate disclosures of which are hereby incorporated by reference. This EDM process may be known by other names such as "electro-discharge", "electro-arc" or "electrospark" machining.

Another feature of the EDM technique is that the machining operation performed on the workpiece is determined by the shape of the tool, such shape including those portions of the electrode that are most proximately arranged to the workpiece.

Figure 4:
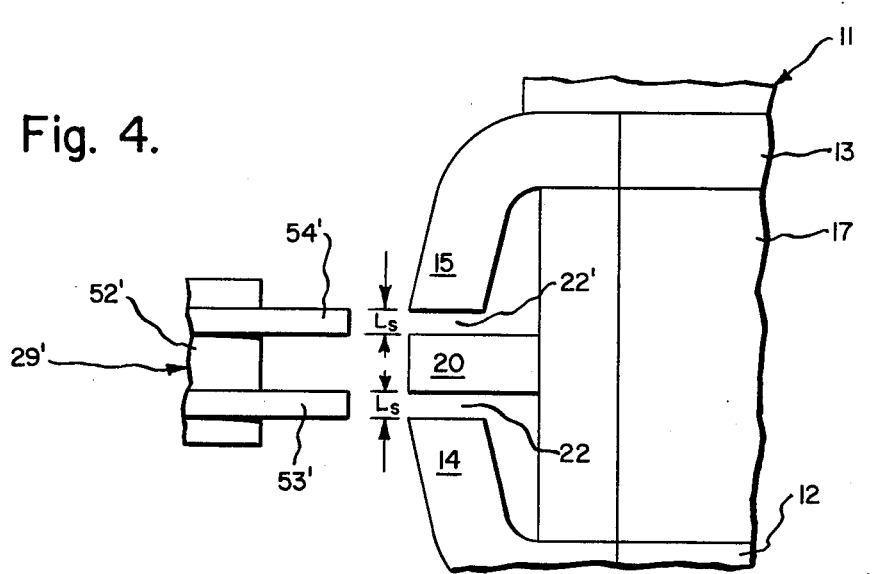
FIG. 4 is a further enlarged fragmentary horizontal sectional view showing the left electrode aligned with respect to the starting air gaps defined between the armature left plate portion and the left polepieces.
Figure 5:
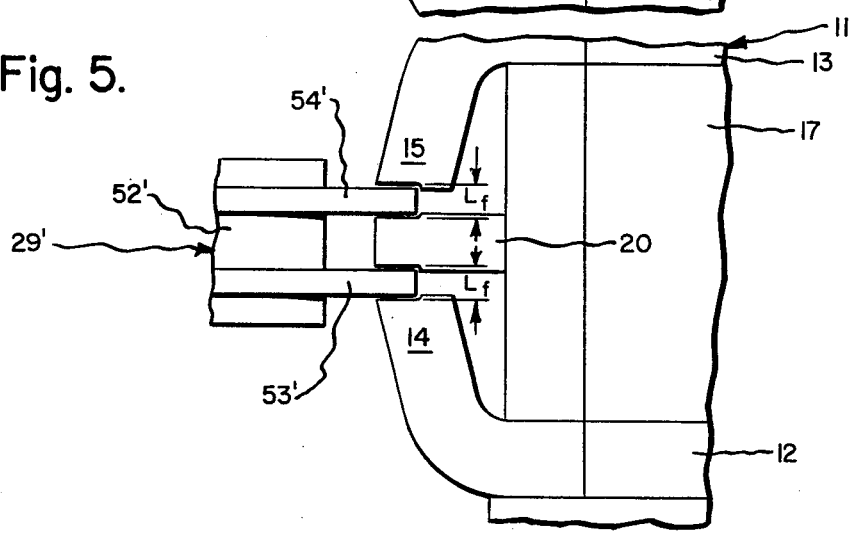
FIG. 5 is a further enlarged fragmentary horizontal sectional view, generally similar to the view of FIG. 4, but showing the left electrode portions arranged in the left air gaps and eroding material from the armature plate portion and the polepieces to machine the air gaps to the final desired length.

Referring now particularly to FIGS. 3, 4 and 5, each of the torque motor assemblies is held to a fixture in the manner depicted in FIG. 2. As initially assembled, the lengths of the torque motor left air gaps 22, 22' may be unequal, and the lengths of right air gaps 23, 23' may be unequal.

To selectively machine the facing surfaces of the armature plate portion and the polepieces, as necessary, so that the pairs of cooperative air gaps will be of equal length, the raised annular rib portions 53, 54 or 53', 54' of each electrode are configured to be of equal width, and are spaced axially from one another so that they are aligned generally with the rough air gaps, indicated as having a starting length $L_s$ in FIG. 4. Thereafter, the EDM circuit is energized, and the actuator 28 is selectively operated to move the slide 26, with the torque motor assemblies mounted thereon, downwardly toward the electrodes 29, 29' at a rate of speed calculable as a function of the amount of material to be removed from the torque motor assemblies.

As the slide 26 moves downwardy, the electrodes 29, 29' are rotated to distribute tool wear, due to erosion of the electrodes, over their working surfaces. As the slide moves further downwardly, the distance between the electrode portions, 53, 54 and 53', 54', and the air gaps 23, 23' and 22, 22', respectively, progressively decreases. At the proper distance, electrical discharge occurs between the electrodes 29, 29' and the torque motor assembly, the effect of this discharge being to erode or machine the facing surfaces of the armature plate portions and the polepieces to provide final air gaps of equal length, the length of these final air gaps being indicated at $L_f$ in FIG. 5. Thus, as such downward movement of the slide continues, the operative electrode raised portions are caused to progressively enter the "cuts" or air gaps being formed. It will be appreciated that for a portion of such downward slide movement, the electrode portions will progressively enter and deepen the air gaps (FIG. 5), and thereafter will progressively withdraw from the air gaps so formed.

In this manner, the electrodes 29, 29' are configured to have operative raised or salient portions 53, 54 and 53', 54', respectively, extending radially outwardly from the electrode peripheral surfaces, which portions are proportional in shape and spacing to the configuration of the desired air gaps. By moving these electrode portions progressively deeper into the starting air gaps, while simultaneously eroding proximate portions of the polepieces and armature plate portions, cooperative final air gaps of equal length ($L_f$) may be provided. The effect of this EDM machining is to insure that the armature plate portion is in the centered or null position between the spaced polepieces.

Accordingly, there is herein disclosed a novel method of providing air gaps of equal length between an armature positioned between two spaced polepieces of a torque motor. This novel method includes the steps of assembling the torque motor so that the armature is initially positioned between the spaced polepieces, the space between this armature and each of the polepieces defining a starting air gap ($L_s$); positioning an electrode, such as one or both of electrodes 29, 29', so that two spaced portions thereof of equal width are arranged proximate the starting air gaps; providing a plurality of repetitious pulses of sufficient electrical potential between the electrode and the torque motor; moving the electrode and torque motor relative to each other; and removing proximate material from the armature and polepieces by electrical discharge between the electrode and torque motor; thereby to provide final air gaps of equal length ($L_f$) between the armature and polepieces.

In the practice of this method, the electrode and torque motor may be moved relative to each other, as by downward sliding movement of the slide, such that the electrode portions are moved progressively deeper into the air gaps. The electrodes may be rotated to distribute wear of the electrode over a relatively large peripheral surface and to prevent concentrated erosion of the electrode in a local area. In a preferred form, the electrode is rotated and the torque motor is slidably moved relative to this electrode such that, during an initial portion of such relative movement, the electrode portions are progressively advanced into the air gaps, and, during a subsequent portion of such relative movement, the electrodes are progressively withdrawn from the air gaps.

In this manner, the apparatus disclosed provides a novel and highly useful method for machining a torque motor to provide cooperative air gaps of equal length between an armature operatively positioned between two spaced polepieces of a torque motor. It should be understood that the advantages of using the EDM process to form air gaps of equal length in a pre-assembled torque motor without physical contact at the point of metal removal, could likewise be realized by use of other equivalent processes, such as electrochemical machining and laser beam machining.

While the particular embodiment of apparatus herein illustrated and described constitutes the best mode contemplated by applicants for practicing their inventive method at the time of filing this application, it should be noted that such embodiment is only an illustrative species not limitative of the broader scope of the invention which is generically defined by the following claims.

What is claimed is:

1. The method of providing a torque motor with air gaps of equal length between an armature interposed between two spaced polepieces, comprising the following steps:
   assembling said torque motor so that said armature is positioned between said polepieces, the space between said armature and each of said polepieces defining one of a cooperative pair of starting air gaps;
   positioning an electrode having two spaced portions of equal dimension such that said electrode portions are arranged proximate said starting air gaps;
   providing a plurality of repetitious pulses of electrical energy to discharge between said electrode and torque motor;
   moving said electrode and torque motor relative to one another; and
   removing proximate material of said armature and polepieces which is positioned closest to said electrode portions by such electrical discharge;
   thereby to provide said torque motor with final air gaps of equal length between said armature and said polepieces.

2. The method as set forth in claim 1 wherein said torque motor is moved linearly relative to said electrode.

3. The method as set forth in claim 1 wherein, during one portion of such relative movement between said electrode and torque motor, said electrode portions are moved progressively deeper into said air gaps.

4. The method as set forth in claim 3 wherein, during a subsequent portion of such relative movement between said electrode and torque motor, said electrode portions are progressively withdrawn from said air gaps.

5. The method of providing a torque motor with final air gaps of equal length between an armature interposed between two spaced polepieces, comprising the following steps:

assembling said torque motor so that said armature is positioned between said polepieces, the space between said armature and each of said polepieces defining one of a cooperative pair of starting air gaps;

positioning such assembled torque motor spaced from a means for removing material from said torque motor without physical contact with said torque motor;

energizing said means to remove material from said armature and polepieces;

thereby to remove material from said armature and polepieces to provide said final air gaps of equal length without physical contact with said torque motor.

* * * * *